(12) United States Patent
Forsyth

(10) Patent No.: US 6,571,654 B2
(45) Date of Patent: Jun. 3, 2003

(54) AUTOMATED MANUAL TRANSMISSION WITH UPSHIFT BALL RAMP SYNCHRONIZER CLUTCH AND DOWNSHIFT BALL RAMP SYNCHRONIZER CLUTCH

(75) Inventor: John R. Forsyth, Romeo, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/023,307

(22) Filed: Dec. 17, 2001

(65) Prior Publication Data

US 2002/0144563 A1 Oct. 10, 2002

Related U.S. Application Data

(60) Provisional application No. 60/281,890, filed on Apr. 5, 2001.

(51) Int. Cl.⁷ ................................................. F16H 3/38
(52) U.S. Cl. ........................................... 74/339; 74/333
(58) Field of Search ................................... 74/333, 339

(56) References Cited

U.S. PATENT DOCUMENTS

| | | |
|---|---|---|
| 5,890,392 A | 4/1999 | Ludanek et al. |
| 5,966,989 A | 10/1999 | Reed, Jr. et al. |
| 6,023,987 A | 2/2000 | Forsyth |
| 6,145,398 A | 11/2000 | Bansbach et al. |

*Primary Examiner*—Dirk Wright
(74) *Attorney, Agent, or Firm*—Harness, Dickey & Pierce P.L.C.

(57) ABSTRACT

An automated multi-speed transmission includes an engine clutch operable to establish a releasable drive connection between the engine and an input shaft, an output shaft adapted to transfer power to the driveline, and a synchromesh geartrain having a plurality of constant-mesh gearsets that can be selectively engaged to establish a plurality of forward and reverse speed ratios. The transmission also includes power-operated dog clutches for selectively engaging the constant-mesh gearsets, and a controller for controlling coordinated actuation of the engine clutch and the power-operated dog clutches. The power-operated dog clutch associated with the low and the top gear are used during downshifts and upshifts, respectively, to actuate a clutch assembly for synchronizing the speed of the input shaft and the selected gear prior to engagement of its corresponding dog clutch.

27 Claims, 6 Drawing Sheets

AUTOMATED MANUAL TRANSMISSION WITH UPSHIFT BALL RAMP SYNCHRONIZER CLUTCH AND DOWNSHIFT BALL RAMP SYNCHRONIZER CLUTCH

CROSS-REFERENCE TO RELATED APPLICATIONS

This application claims the benefit of U.S. Provisional Application No. 60/281,890, filed Apr. 5, 2001.

FIELD OF THE INVENTION

The present invention relates generally to multi-speed transmissions for motor vehicles and, more particularly, to an automated manual transmission and a method of controlling automated gear shifts.

BACKGROUND OF THE INVENTION

As known, automobile manufacturers are continuously striving to improve fuel efficiency. However, this effort to improve fuel efficiency, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to the smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch automated transmissions are satisfactory for their intended purpose, a need exists to develop simpler and more robust transmissions which advance the automotive transmission technology.

SUMMARY OF THE INVENTION

Accordingly, it is an object of the present invention to provide an automated transmission and a control system for permitting automatic shifting of the transmission.

This and other objects of the present invention are met by providing an automated multi-speed transmission adapted to transfer power from the engine to the driveline of a motor vehicle. The transmission includes an engine clutch operable to establish a releasable drive connection between the engine and an input shaft. The transmission also includes an output shaft adapted to transfer power to the driveline, and a synchromesh geartrain having a plurality of constant-mesh gearsets that can be selectively engaged to establish a plurality of forward and reverse speed ratio drive connections between the input shaft and the output shaft. The transmission also includes power-operated dog clutches for selectively engaging the constant-mesh gearsets, and a transmission controller for controlling coordinated actuation of the engine clutch and the power-operated dog clutches.

In accordance with the invention, the power-operated dog clutch associated with mid-range low gear is used during shifts to controllably actuate a clutch assembly for causing speed synchronization between the input shaft and the selected gear prior to engagement of its corresponding dog clutch. Similarly, the power-operated dog clutch associated with the top gear is used during shifts to controllably actuate a clutch assembly for causing speed matching between the input shaft and the selected gear prior to engagement of its corresponding dog clutch. These synchronization clutch assemblies have sufficient capacity to permit the engine clutch to remain engaged during the speed matching phase of the gear shift so as to permit non-power interrupted ("powershift") sequential gear changes.

The first and second synchronization clutch assemblies are used to increase the speed of the input shaft during downshifts and retard the speed of the input shaft during upshifts. Therefore, selective actuation of either of these two synchronization clutch assemblies in conjunction with an appropriate control system permits upshifts and downshifts to be accomplished by engaging a slipping the appropriate clutch assembly until the input shaft speed required to engage the selected gear is reached. Once the speed is properly matched, the corresponding power-operated dog clutch is actuated to engage the selected gear.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the scope of this invention will become apparent to those skilled in the art.

DETAILED DESCRIPTION OF THE PREFERRED EMBODIMENTS

The present invention is directed to incorporation of an electronically-controlled speed synchronization and automated gear shift system into a constant-mesh countershaft transmission in substitution for its conventional manually-actuated dog clutch shift system. The "automated" manual transmission of the present invention incorporates a synchronization clutch assembly into a mid-range gear which can be engaged to increase the input shaft speed during downshifts and decrease the input shaft speed during upshifts. The automated manual transmission also includes a second synchronization clutch assembly incorporated into the high gear which can be engaged to reduce the input shaft speed during certain upshifts. The use of the downshift and upshift synchronization clutch assemblies permits the engine clutch to remain engaged during the speed matching phase of the automated shift process. While the automated shift system is shown in conjunction with a specific six-speed transmission arrangement, it will be understood that the particular arrangement shown is merely exemplary and is not intended to limit the wide spectrum of transmission applications to which the present invention can be utilized.

Figure 1:
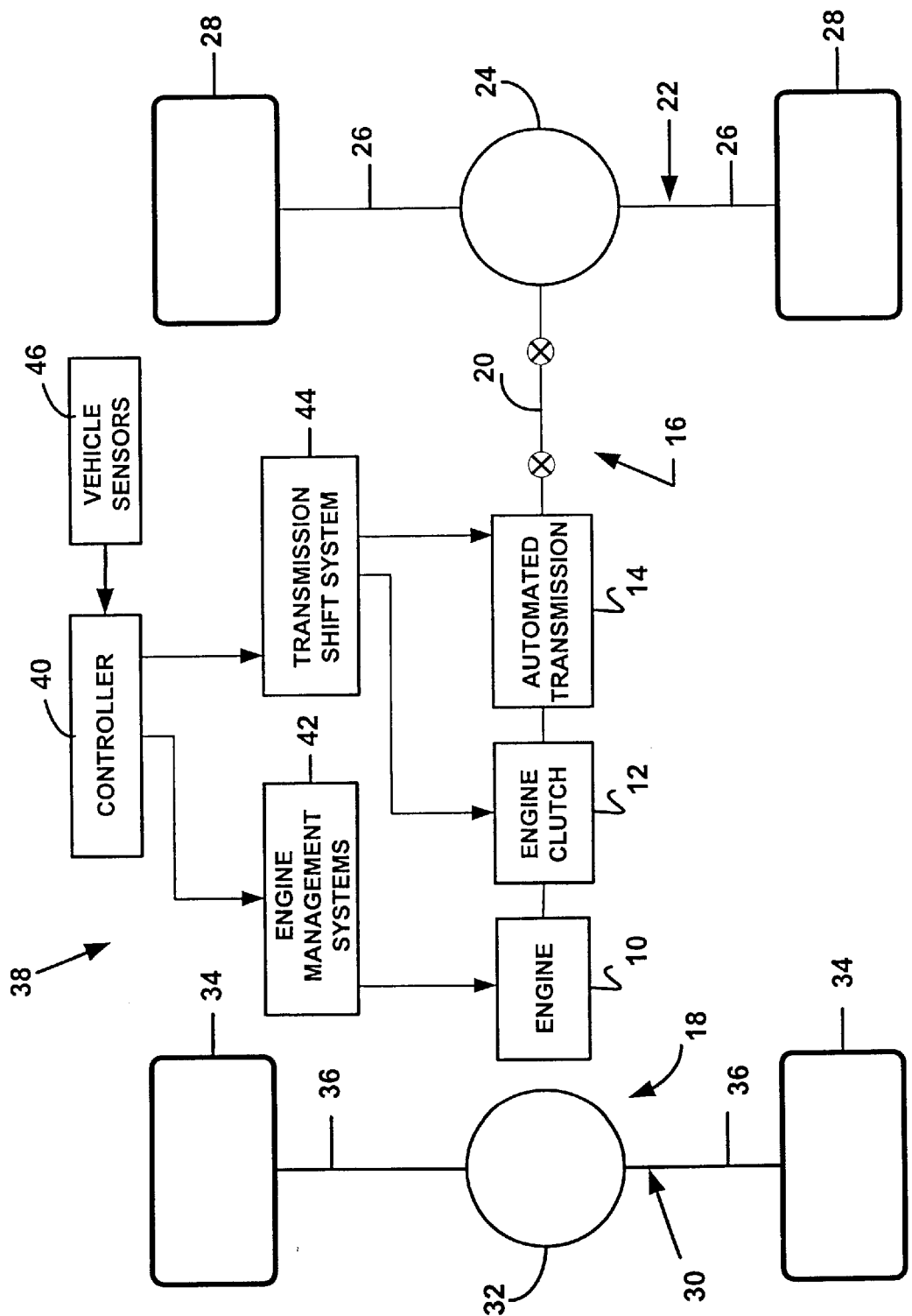
FIG. 1 is a schematic illustration of a powertrain for a motor vehicle equipped with an automated multi-speed transmission according to the present invention.
Figure 2:
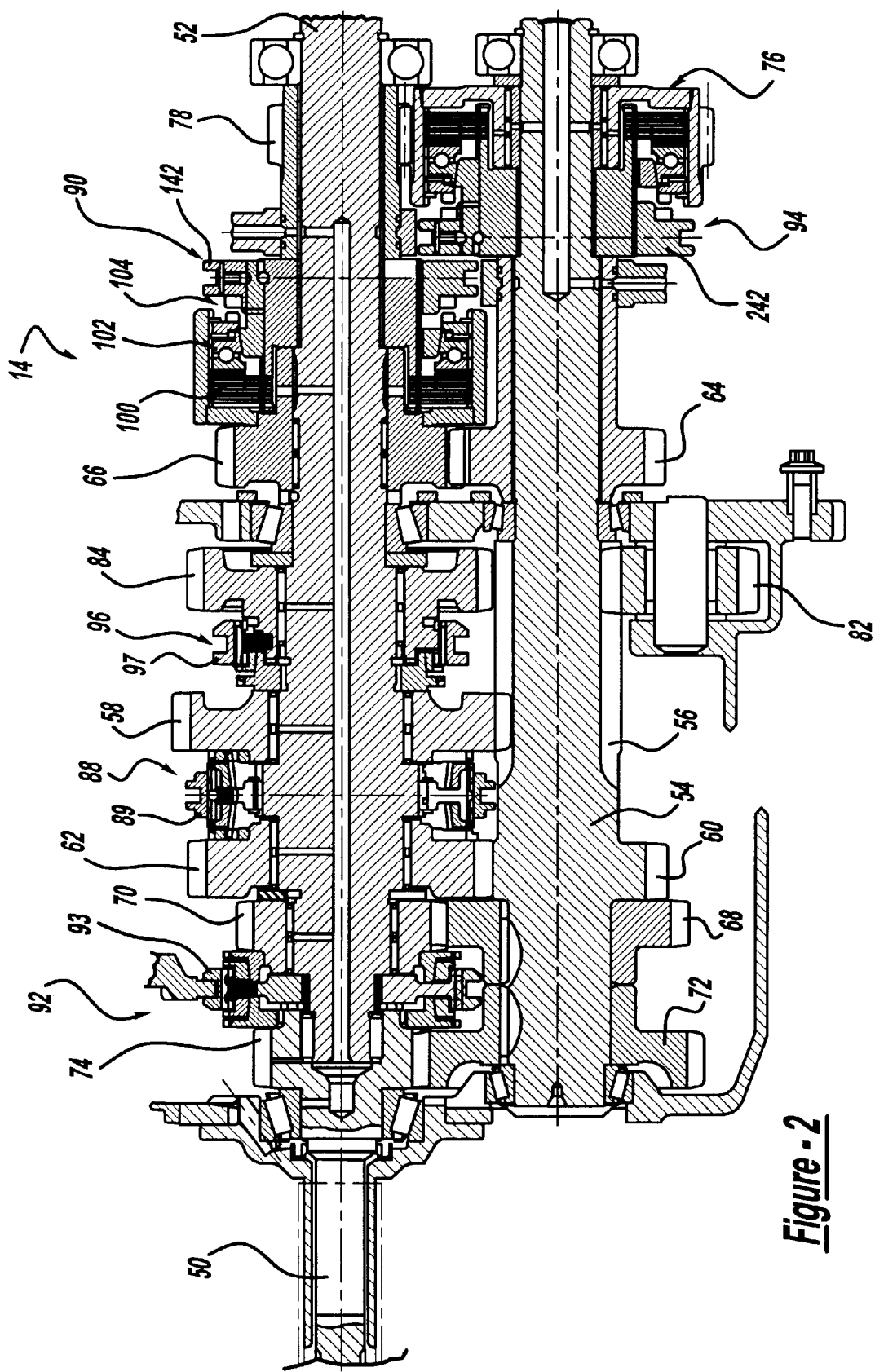
FIG. 2 is a sectional view of the automated multi-speed transmission of the present invention.

Referring to FIG. 1, a powertrain for a motor vehicle is shown to include an engine 10, releasably coupled via an engine clutch 12 to an automated transmission 14, a primary driveline 16, and a secondary driveline 18. Primary driveline 16 includes a driveshaft 20 driven by the output of transmission 14 and an axle assembly 22 having a differential unit 24 driven by driveshaft 20. A pair of axleshaft 26 interconnect a pair of wheels 28 to differential unit 24. Secondary driveline 18 includes an axle assembly 30 with a differential unit 32 interconnecting a pair of wheels 34 via axleshafts 36. A powertrain control system 38 is arranged to control operation of engine 10 and the automatic shifting of transmission 14. Control system 38 is schematically shown to include a controller 40 that is adapted to control actuation of various engine management systems 42 and a transmission shift system 44 based on operating characteristics of the motor vehicle, as detected by various vehicle sensors 46.

Referring now to FIGS. 2 through 6, the components and function of automated transmission 14 will be described in detail. In general, transmission 14 includes an input shaft 50, an output shaft 52, a countershaft 54, and a plurality of constant-mesh gearsets which can be selectively engaged to establish six forward gear ratios and one reverse gear ratio. The first gearset includes a first drive gear 56 fined to countershaft 54 and which is meshed with a first output gear 58 rotatably supported on output shaft 52. The second gearset includes a second drive gear 60 fixed to countershaft 54 and which is meshed with a second output gear 62 rotatably supported on output shaft 52. The third gearset includes a third drive gear 64 fixed to countershaft and which is meshed with a third output gear 66 rotatably supported on output shaft 52. The fourth gearset includes a fourth drive gear 68 fixed to countershaft 54 and which is meshed with a fourth output gear 70 rotatably supported on output shaft 52. The fifth gearset includes a fifth drive gear 72 fixed to countershaft 54 and which is meshed with a fifth output gear 74 fixed to input shaft 50. Another or sixth gearset includes another or a sixth drive gear 76 rotatably supported on countershaft 54 and which is meshed with another or sixth output gear 78 fixed to output shaft 52. Finally, the seventh or reverse gearset includes an idler gear 82 meshed with first drive gear 56, and a seventh output gear 84 that is meshed with idler gear 82 and rotatably supported on output shaft 52.

The gearsets are selectively engaged to establish the forward and reverse gear ratio drive connections between input shaft 50 and output shaft 52 via a plurality of power-operated shift clutches. Transmission shift control system 44 includes a first shift clutch 88 operable for selectively coupling one of first output gear 58 and second output gear 62 to output shaft 52, a second shift clutch 90 operable for selective coupling third output gear 66 for rotation with output shaft 52, and a third shift clutch 92 operable for selectively coupling one of fourth output gear 70 and fifth output gear 74 for rotation with output shaft 52. Transmission shift system 44 further includes another or a fourth shift clutch 94 for selectively coupling the another or sixth drive gear 76 to countershaft 54 and a fifth shift clutch 96 for selectively coupling seventh output gear 84 to output shaft 52. As is seen, first shift clutch 88, third shift clutch 92 and fifth shift clutch 96 are all shown to be synchronized dog clutches of a type commonly used in manually-shifted multi-speed transmissions. In particular, each dog clutch has a clutch sleeve supported for axial sliding movement between a released position and an engaged position whereat a positive coupled engagement is established with the corresponding output gear. However, second shift clutch 90 and fourth shift clutch 94 are different in that each is a combination synchronized dog clutch and multi-plate clutch assembly that is arranged to provide a speed synchronizing function in addition to positive coupled engagement.

Figure 3:
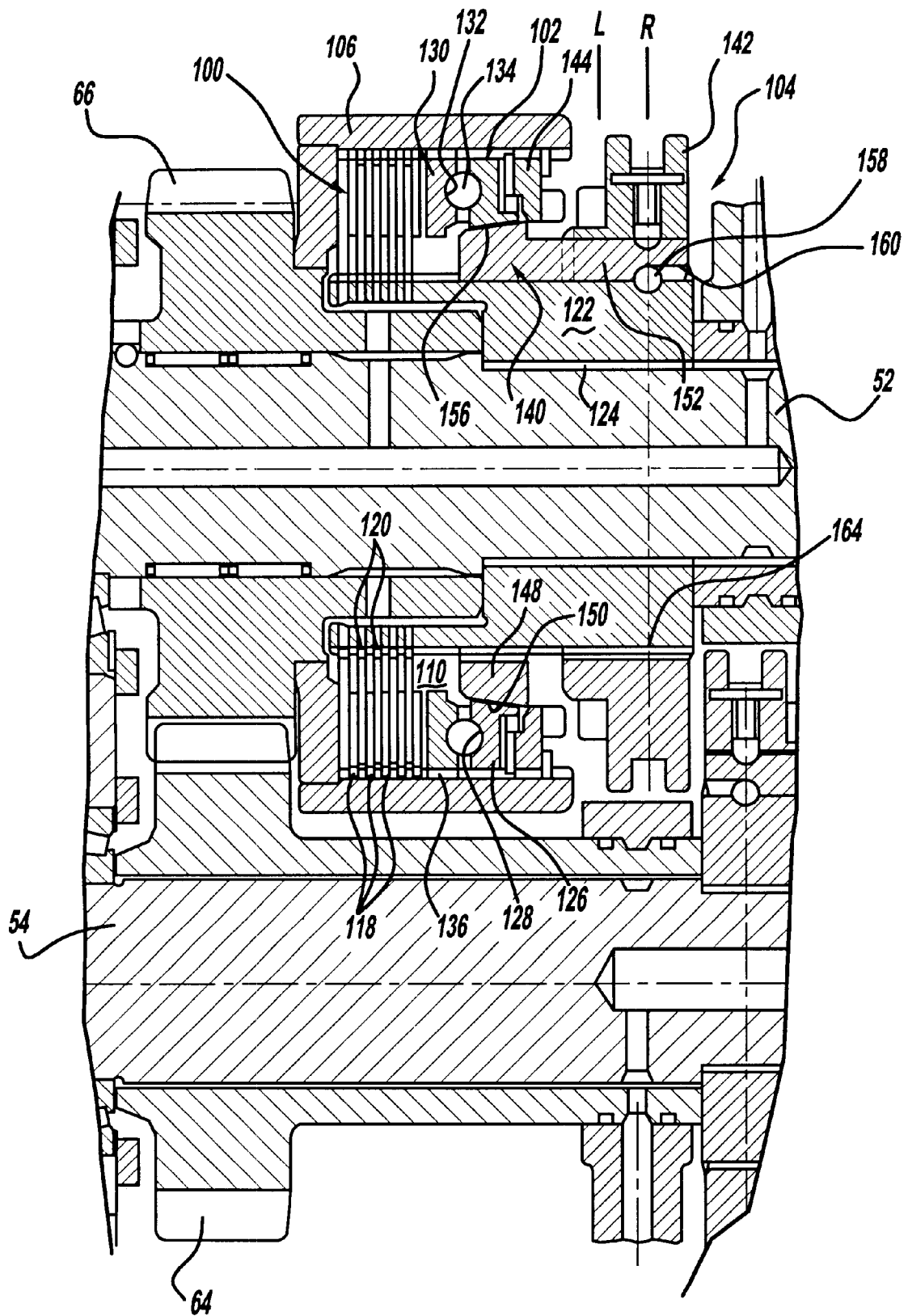
FIG. 3 is a sectional view of a first synchronization clutch assembly associated with the automated transmission shown in FIG. 2.
Figure 4:
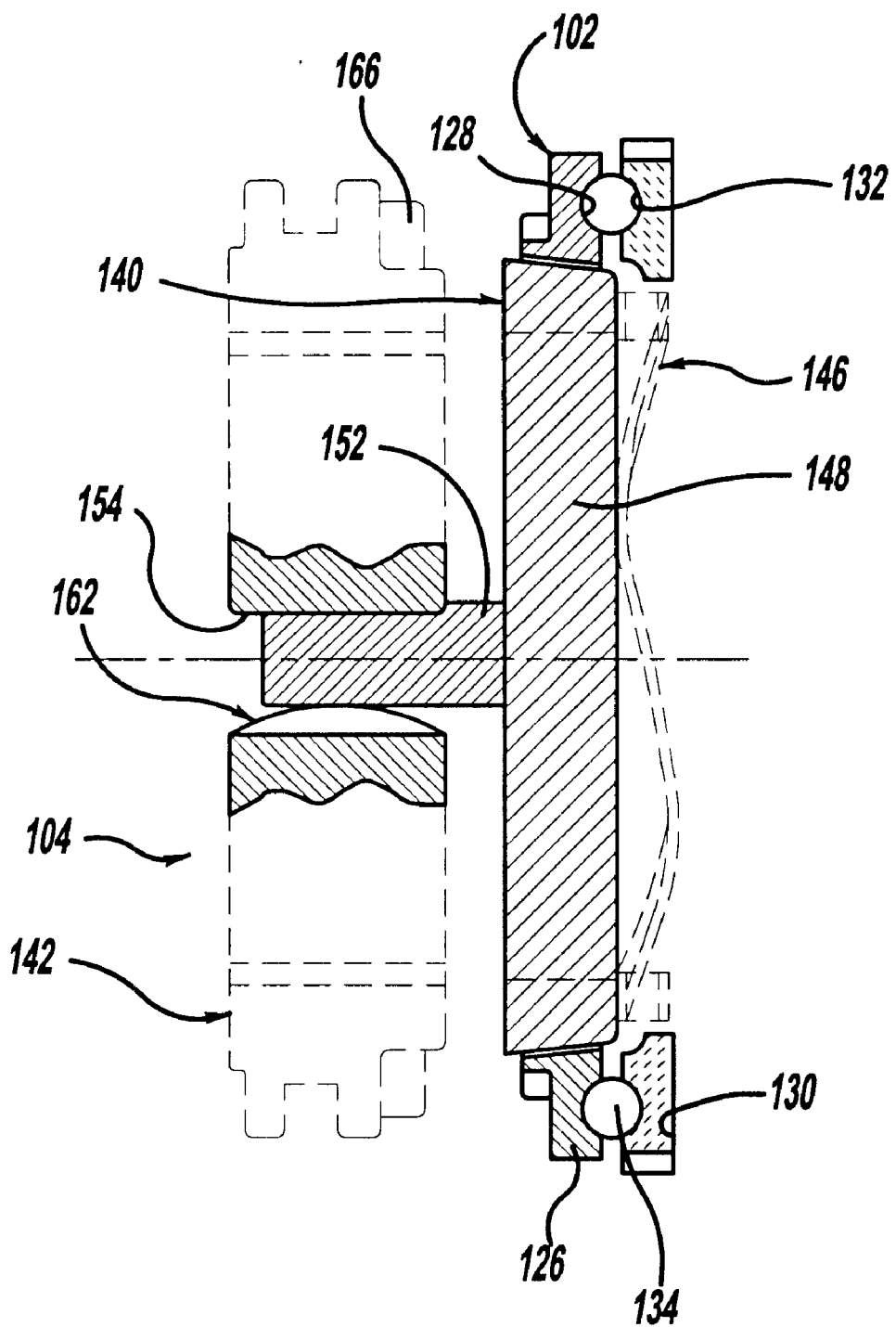
FIG. 4 is a partial sectional view of the first synchronization clutch assembly taken in the direction of arrow "A" shown in FIG. 3.

With particular reference to FIGS. 3 and 4, second shift clutch 90, hereinafter referred to as first synchronization clutch assembly, is shown to generally include a clutch pack 100, a ball-ramp clutch actuator 102, and a synchronized dog clutch 104 associated with third output gear 66. In particular, a clutch drum 106 is rigidly fixed (i.e., welded) to third output gear 66 to define a clutch chamber 110. Clutch pack 100 is mounted with clutch chamber 110 and includes a set of outer clutch plates 118 that are alternately interleaved with a set of inner clutch plates 120. Outer clutch plates 118 are splined to clutch drum 106 while inner clutch plates 120 are splined to a drive hub 122 associated with synchronized dog clutch 104. Drive hub 122 is fixed via a splined connection 124 for rotation with output shaft 52. As such, inner clutch plates 120 rotate at the speed of output shaft 52 while outer clutch plates 118 rotate at the speed of third output gear 66, which is dictated by the rotary speed of countershaft 54 and the mesh ratio of the third gearset. Thus, third speed gear 66 and outer clutch plates 118 will rotate slower than output shaft 52 and inner clutch plates 120 in higher (i.e., fourth, fifth and sixth), gear and rotate faster than output shaft 52 and inner clutch plates 20 in any lower (i.e., first and second) gear.

As will be detailed, first synchronization clutch assembly 90 can be selectively actuated to provide a speed synchronizing function as a result of engagement of clutch pack 100 during a downshift from any higher gear ratio and during upshifts from any lower gear ratio. Specifically, engagement of clutch pack 100 causes changes in the rotary speed of countershaft 54 and all elements connected thereto including input shaft 50. Accordingly, a controlled automated downshift can be accomplished by engaging and slipping clutch pack 100 until the input shaft speed required to engage the next lower gear is matched. Likewise, a controlled automated upshift can be accomplished by engaging and slipping clutch pack 100 until the input shaft speed required to engage the next higher gear is matched. Once the input shaft speed is properly matched to the speed of the selected output gear, its corresponding power-operated shift clutch can be engaged to establish the positive drive connection between input shaft 50 and output shaft 52.

With continued reference to FIGS. 3 and 4, an arrangement for generating and applying a clutch engagement force on clutch pack 100 will be detailed. Specifically, ball-ramp clutch actuator 102 includes an actuator ring 126 defining a set of first cam tracks 128, a reaction ring 130 defining a set of second cam tracks 132, and rollers 134 retained within the aligned sets of cam tracks 128 and 132. Cam tracks 128 and 132 are formed in the shape of an oblique section of a helical torus. Reaction ring 130 is fixed via a splined connection 136 for rotation with clutch drum 106 and is supported in clutch chamber for sliding movement relative to clutch pack 100. Relative rotation between actuator ring 126 and reaction ring 130 causes rollers 134 to ride in the cam tracks which, in turn, causes a corresponding amount of axial movement of reaction ring 130. In this manner, reaction ring 130 exerts a compressive clutch engagement force on clutch pack 100. It is contemplated that tracks 128 and 132 and the load transferring ball rollers 134 can be replaced with other elements operable to cause axial displacement in response to relative rotation between two adjacent members.

Synchronized dog clutch 104 generally includes a blocker ring 140, a clutch sleeve 142, a clutch ring 144 and a return spring 146. Blocker ring 140 is supported for axial sliding movement on drive hub 122 and includes a ring segment 148 defining an outer frusto-conical friction surface 150 and a plurality of axially-extending circumferencially-spaced lugs 152 that are retained in window apertures 154 formed in clutch sleeve 142. Friction surface 150 of ring segment 148 is aligned in facing relationship with an inner frusto-conical friction surface 156 formed in actuator ring 126. Return spring 146 acts on blocker ring 140 so as to forcibly urge it in a first direction to maintain clearance between the tapered friction surfaces. Detent balls 158, seated in drive hub 122 within slots 160 formed in blocker ring lugs 152, limit movement of blocker ring 140 in the first direction so as to normally locate blocker ring 140 in a retracted position relative to actuator ring 126. FIG. 4 shows a clocking spring 162 which acts to force a chamfered edge surface of lugs 152 against a like chamfered edge surface of blocker ring aperture 154 such that blocker ring 140 moves axially with clutch sleeve 142.

Clutch sleeve 142 is secured via a splined connection 164 to drive hub 122 and is axially moveable thereon through and range of motion defined between a Released ("R") position shown and a Locked ("L") position. With clutch sleeve 142 in its R position, blocker ring 140 is located in its retracted position and clutch teeth 166 on clutch sleeve 142 are displaced from clutch teeth 168 on clutch ring 144 which, as shown, is fixed via a splined connection 170 to clutch drum 106. A thrust bearing 172 is located between clutch ring 144 and actuator ring 126. With clutch sleeve 142 in its L position, clutch teeth 166 meshingly engage clutch teeth 168 such that clutch sleeve 142 positively couples third output gear 66 to drive hub 122 for rotation with output shaft 52. Moreover, movement of clutch sleeve 142 from its R position toward its L position causes corresponding axial movement of blocker ring 140 such that blocker ring friction surface 150 engages actuator ring friction surface 156. Such frictional engagement causes relative rotation between actuator ring 126 and reaction ring 130 which, as noted, causes axial movement of reaction ring 130 relative to clutch pack 100. This axial movement causes reaction ring 130 to exert a corresponding clutch engagement force on clutch pack 100 which acts vary the rotary speed of countershaft 54 relative to output shaft 52. Thus, first synchronization clutch assembly 90 performs two primary functions, namely, (1) speed synchronization during certain downshifts and upshifts, and (2) engagement of third output gear 66 to output shaft 52 for establishing the third forward gear. It should be noted that, during the speed matching operation, clutch sleeve 142 does not move completely into its L position such that its clutch teeth 166 remain disengaged from clutch ring teeth 168.

Figure 5:
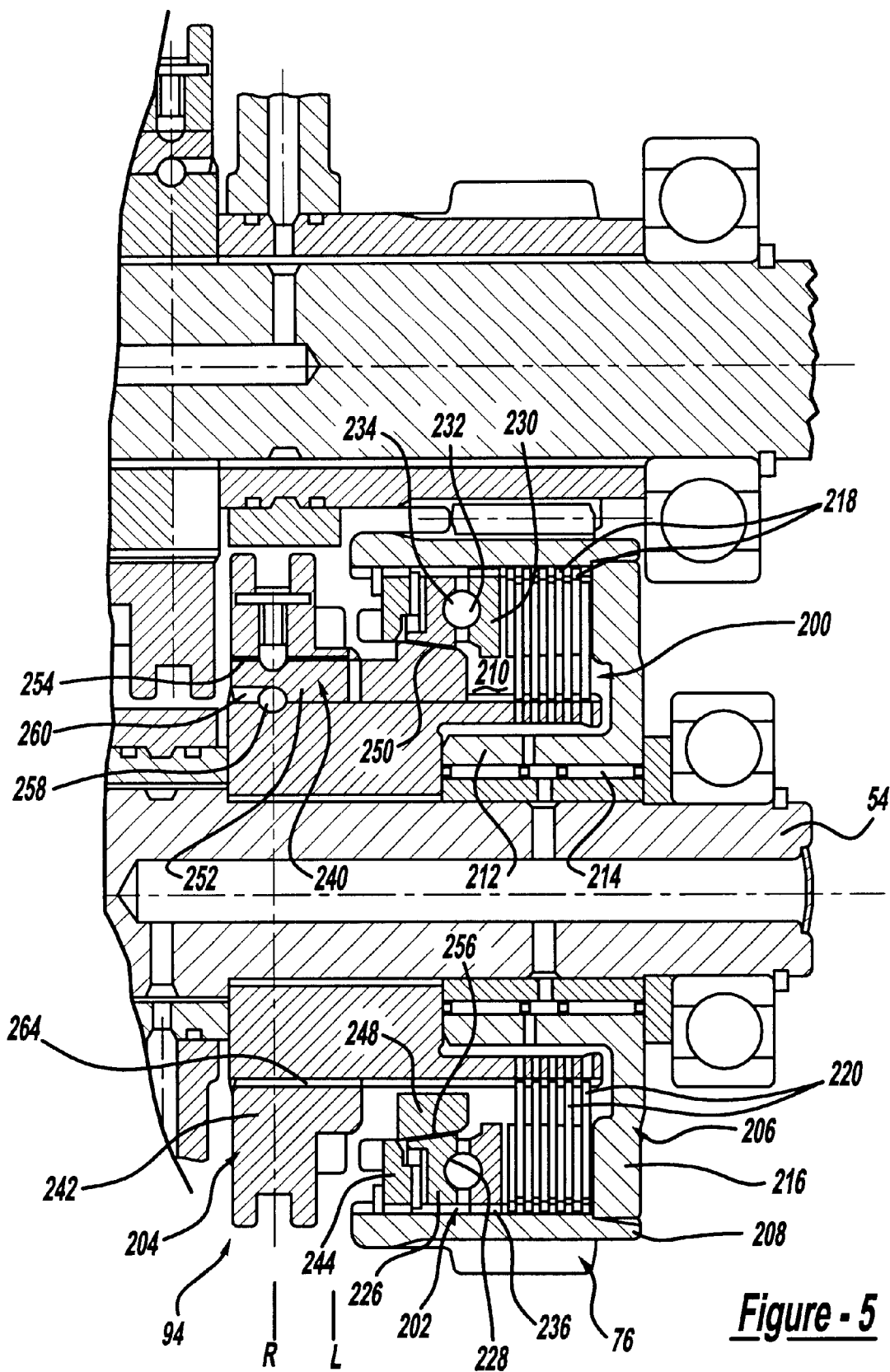
FIG. 5 is a sectional view of a second synchronization clutch assembly associated with the automated transmission shown in FIG. 2.

With particular reference now to FIG. 5, the another or fourth shift clutch 94, hereinafter referred to as second synchronization clutch assembly, is shown to be generally similar in structure to first synchronization clutch assembly 88. In particular, second synchronization clutch assembly 94 includes a clutch pack 200, a ball-ramp clutch actuator 202, and a synchronized dog clutch 204 integrated into the another or sixth drive gear 76. The another or sixth drive gear 76 is a two-piece construction having a hub segment 206 rigidly fixed (i.e., welded) to a tubular gear segment 208 to define a clutch chamber 210. Hub segment 206 includes an annular sleeve 212 that is rotatably supported on a countershaft 54 by a bearing assembly 214 and a radial plate 216 formed at one end of sleeve 212. Clutch pack 200 is mounted in clutch chamber 210 and includes a set of outer clutch plates 218 that are splined to gear segment 208 and which are interleaved with a set of inner clutch plates 220 splined to a drive hub 222 associated with synchronized dog clutch 204. Drive hub 222 is fixed via a splined connection 224 for rotation with countershaft 54. As such, inner clutch plates 220 rotate at the speed of countershaft 54 while outer clutch plates 218 rotate at the speed of the another or sixth drive gear 76, which is dictated by the rotary speed of output shaft 52 and the mesh ratio for the another or sixth gearset.

With this arrangement, the another or sixth drive gear 76 and outer clutch plates 218 rotate slower than countershaft 54 and inner clutch plates 220 in any forward gear except the top (i.e., sixth) gear. Thus, clutch assembly 94 can be selectively actuated to provide a speed synchronization function by engaging clutch pack 200 during an upshift from any of the lower gear ratios since engagement of clutch pack 200 acts to retard the rotary speed of countershaft 54 and all elements connected thereto. However, it is preferred that clutch assembly 94 only be selectively actuated to provide speed synchronization during up shifts from third gear since first clutch assembly 90 is used for speed synchronization during upshifts up to the third gear. Accordingly, a controlled automated upshift can be accomplished by engaging and slipping clutch pack 200 until the input shaft speed required to engage the selected gear is matched. Once the input shaft speed is properly matched to the speed of the selected output gear, its corresponding power-operated shift clutch can be engaged to establish the positive drive connection between input shaft 50 and output shaft 52.

With continued reference to FIG. 5, an arrangement for generating and applying a clutch engagement force on clutch pack 200 is shown. Specifically, ball-ramp clutch actuator 202 includes an actuator ring 226 defining a set of first cam tracks 228, a reaction ring 230 defining a set of second cam tracks 232, and rollers 234 retained within the aligned sets of cam tracks. Reaction ring 230 is fixed via a spumed connection 236 for rotation with the another or sixth drive gear 76 and sliding axial movement relative to clutch pack 200. Relative rotation between actuator ring 226 and reaction ring 230 causes rollers 234 to ride in the aligned cam tracks which, in turn, causes a corresponding amount of axial movement of reaction ring 230 into engagement with clutch pack 200 for exerting a compressive clutch engagement force thereon.

Synchronized dog clutch 204 generally includes a blocker ring 240, a clutch sleeve 242, a clutch ring 244 and a return spring (not shown). Blocker ring 240 is supported for axial sliding movement on drive hub 222 and includes a ring segment 248 defining an outer frusto-conical friction surface 250 and a plurality of axially-extending lugs 252 that are retained in window apertures 254 formed in clutch sleeve 242. Friction surface 250 of ring segment 248 is aligned in facing relationship with an inner frusto-conical friction surface 256 formed in actuator ring 226. The return spring acts on blocker ring 240 so as to forcibly urge it in a first direction to maintain clearance between the tapered friction surfaces. Detent balls 258 are seated in drive hub 222 within slots 260 formed in blocker ring lugs 252 to limit rearward movement of blocker ring 240 so as to normally locate blocker ring 240 in a retracted position relative to actuator ring 226. A clocking spring (not shown), similar to the one shown in FIG. 4, acts to force a chamfered edge surface of lugs 252 against a like chamfered edge surface of blocker ring aperture 254 such that blocker ring 240 moves with clutch sleeve 242.

Another clutch sleeve 242 is secured via a splined connection 264 to drive hub 222 and is axially moveable thereon through and range of motion defined between a Released ("R") position shown and a Locked ("L") position. In its R position, clutch teeth 226 on another clutch sleeve 242 are displaced from clutch teeth 268 on clutch ring 244 which, as shown, is fixed via a splined connection 270 to gear segment 208 of sixth drive gear 76. A thrust bearing 272 is located between clutch ring 244 and actuator ring 226. In the L position, its clutch teeth 266 meshingly engage clutch ring teeth 268 such that clutch sleeve 242 positively couples the another or sixth drive gear 76 to drive hub 222 for rotation with countershaft 54. Moreover, axial movement of clutch sleeve 242 from its R position toward its L position causes corresponding axial movement of blocker ring 240 for causing blocker ring friction surface 250 to engage actuator ring friction surface 256. Such frictional engagement causes relative rotation between actuator ring 226 and reaction ring 230 which, as noted, causes axial movement of reaction ring 230 relative to clutch pack 200. Reaction ring 230 applies a compressive clutch engagement force on clutch pack 200 while acts to reduce the rotary speed of countershaft 54 relative to output shaft 52. Thus, second synchronization clutch assembly 94 also performs two primary functions, namely, (1) speed synchronization during certain upshifts, and (2) clutch engagement, of the another or sixth drive gear 76 to countershaft 54 for establishing the sixth forward gear.

Figure 6:
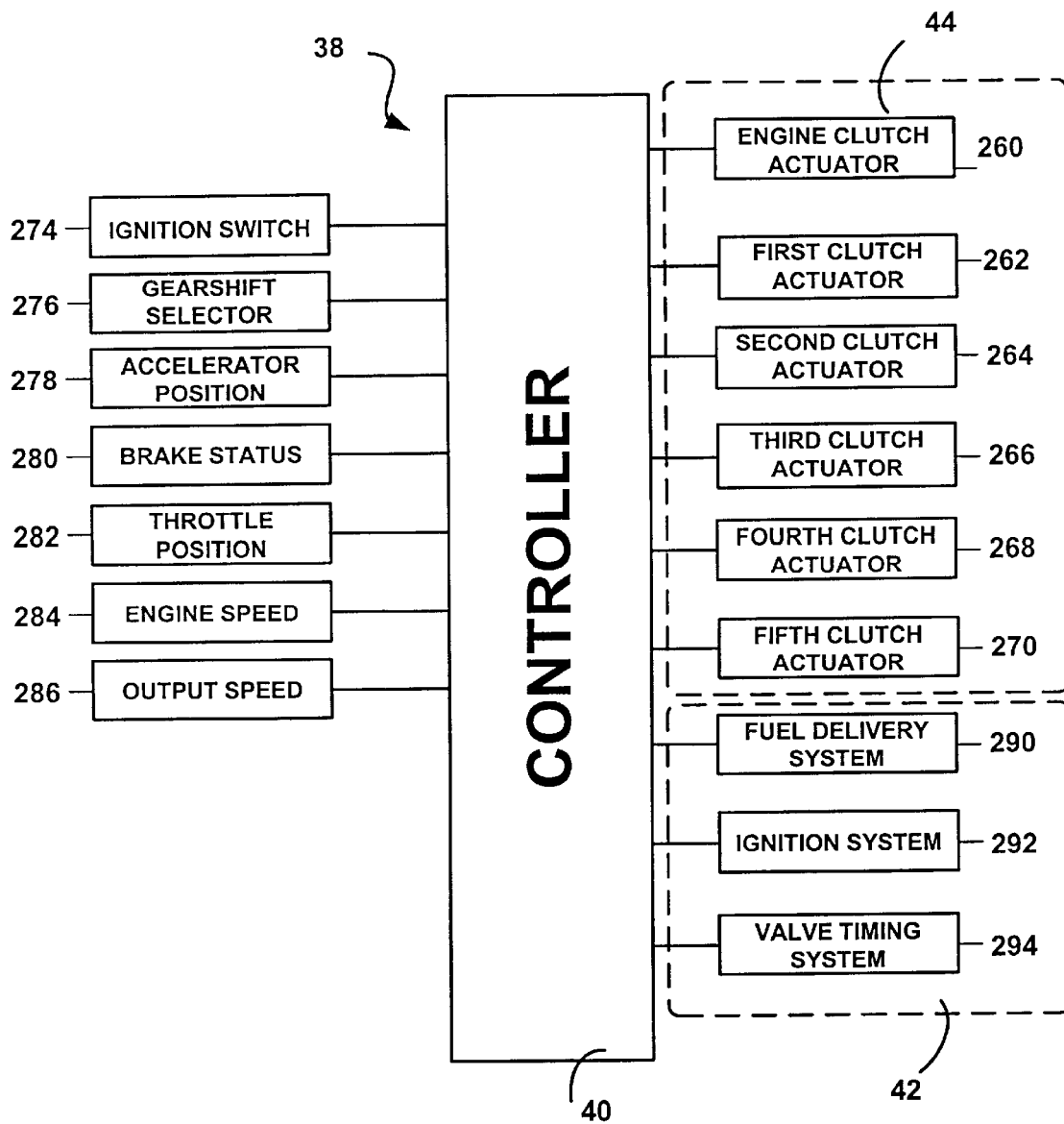
FIG. 6 is a diagram of a powertrain control system used to control automatic shifting of the automated transmission.

FIG. 6 schematically illustrates the components contemplated for use with powertrain control system 38. In particular, transmission shift system 44 is shown to include a plurality of power-operated clutch actuators operable to control actuation of the corresponding engine and shift clutches. These include an engine clutch actuator 260 operable for controlling engagement of engine clutch 12, a first clutch actuator 262 operable for controlling axial movement of clutch sleeve 89 associated first synchronization clutch assembly 88, a second clutch actuator 264 operable for controlling axial movement of clutch sleeve 142 associated with second shift clutch 90, and a third clutch actuator 266 operable for controlling axial movement of a clutch sleeve 93 associated with third shift clutch 92. Additionally, a fourth clutch actuator 268 is operable for controlling axial movement of clutch sleeve 242 associated with second synchronization clutch assembly 94, and a fifth clutch actuator 270 is operable for controlling axial movement of a clutch sleeve 97 associated with fifth shift clutch 96. Each clutch actuator is an electrically-activated device adapted to receive an electric control signal from controller 40.

As noted, controller 40 receives input signals from various sensors, cumulatively identified in FIG. 1 as vehicle sensors 46. Controller 40 is principally comprised of a microcomputer having a central processing unit (CPU), random-access memory (RAM), read-only memory (ROM), and an input-output actuator interface. Controller 40 performs data processing operations to execute various control routines according to control programs and/or maps stored in the ROM. Controller 40 receives data from an ignition switch 274, a gearshift lever switch 276, an accelerator position sensor 278, a brake status switch 280, and a throttle position sensor 282. In addition, other inputs include an engine speed sensor 284 and an output shaft speed sensor 286. Ignition switch 274 is closed when the vehicle key is turned on. Corresponding switches in gearshift selector switch 276 are closed when the gearshift mechanism is located in its PARK, NEUTRAL, REVERSE and DRIVE positions. Accelerator position sensor 278 senses the depression angle of an accelerator pedal. Brake status switch 280 is turned on when the brake pedal is depressed. Throttle position sensor 282 senses the degree of opening of the engine throttle valve. Engine speed sensor 284 senses a parameter indicative of the rotary speed of the drive shaft of engine 10. Finally, shaft speed sensor 286 senses the rotary speed of output shaft 52 or propshaft 20 and can further be used as an indication of vehicle speed.

Based on the operating information inputted to controller 40, a mode of operation of the powertrain is selected and controller 40 sends electric control signals to various power-operated control devices. Specifically, controller 40 monitors and continuously controls shifting of transmission 14 and various engine management systems for controlling the speed and torque generated by engine 10. These engine management control systems 42 include a fuel delivery system 290, an ignition system 292, and a valve timing system 294.

When it is desired to supply motive power from engine 10 to primary driveline 16, the gearshift lever is moved from PARK to DRIVE and engine clutch 12 is engaged via actuation of engine clutch actuator 260 for delivering drive torque to input shaft 50, and first clutch actuator 262 is activated to move clutch sleeve 89 to its engaged position, thereby coupling first output gear 58 to output shaft 52 to establish the first forward gear drive connection.

When the operating conditions of the vehicle indicate a need to automatically shift into second gear, clutch sleeve 89 is moved to its central released position for uncoupling first output gear 58 from output shaft 52. Controller 40 then activates second clutch actuator 264 to cause clutch sleeve 142 to move from its Released position toward its Locked position. Such axial movement of clutch sleeve 142 causes corresponding axial movement of blocker ring 140, in opposition to return spring 146, which cause blocker ring friction surface 150 to engage friction surface 156 on actuator ring 126. As noted, such frictional engagement results in relative rotation between actuator ring 126 and reaction ring 130, thereby causing reaction ring 130 to move axially and exert a clutch engagement force on clutch pack 100. With engine clutch 12 still engaged, slipping of clutch pack 100 causes the rotary speed of countershaft 54 to decrease relative to output shaft 52. Once controller 40 determines that the rotary speed of second output gear 62 is synchronized with the rotary speed of output shaft 52, first clutch actuator 262 is activated to move clutch sleeve 89 from its central released position to a second engaged position. With clutch sleeve 89 in its second engaged position, second output gear 62 is releasably coupled to output shaft 52, thereby establishing the second gear drive connection. Thereafter, second clutch actuator 264 is signaled to return clutch sleeve 142 to its Released position so as to release clutch pack 100. Preferably, engine management systems 42 are controlled in conjunction with transmission shift system 44 to reduce engine torque during the speed-matching phase of the upshift gear shift operation.

Thereafter, when the operating conditions of the vehicle indicate a need to automatically shift into third gear, first clutch actuator 262 is actuated to cause clutch sleeve 89 to move from its second engaged position with second output gear 62 to its central released position, thereby uncoupling second output gear 62 from output shaft 52. Controller 40 then activates second clutch actuator 264 to again cause clutch pack 100 to retard the rotary speed of countershaft 54 relative to output shaft 52. Once the rotary speed of third output gear 66 is matched with that of output shaft 52, second clutch actuator 264 moves clutch sleeve 142 into its Locked position. With clutch sleeve 142 in its Locked position, third output gear 66 is releasably coupled to output shaft 52 and the third gear drive connection is established.

When controller 40 determines that the vehicular operating conditions require shifting of transmission 14 into fourth gear, second clutch actuator 264 returns clutch sleeve 142 to its Released position and fourth clutch actuator 268 is activated to move clutch sleeve 242 from its Released position toward its Locked position. Such movement of clutch sleeve 242 causes dog clutch 204 to activate ball-ramp actuator 202 for exerting a clutch engagement force on clutch pack 200 and synchronizing the speed of fourth output gear 70 to output shaft 52. Upon speed synchronization, third clutch actuator 266 is activated to move clutch sleeve 93 from its central neutral position to a first engaged position, thereby coupling fourth output gear 70 to output shaft 52 and establishing fourth gear. After fourth gear is established, fourth clutch actuator 268 is activated to move clutch sleeve 242 back to its Released position and release clutch pack 200.

To establish fifth gear, clutch sleeve 93 is returned to its central released position and fourth clutch actuator 268 is again actuated to move clutch sleeve 242 toward its Locked position for engaging clutch pack 200. Upon completion of speed synchronization between fifth output gear 74 and output shaft 52, third clutch actuator 266 is activated to move clutch sleeve 93 from its central released position to a second engaged position, whereby fifth output gear 74 is releasably coupled to output shaft 52 and the fifth forward gear is established. Thereafter, fourth clutch actuator 268 is signaled to return clutch sleeve 242 to its Released position.

To establish the sixth forward speed, third clutch actuator 266 is activated to move clutch sleeve 93 to its central position for uncoupling fifth output gear 74 from output shaft 52. Next, fourth clutch actuator 268 is activated for moving clutch sleeve 242 from its Released position to its Locked position to cause speed synchronization of the another or sixth drive gear 76 with countershaft 54. Upon completion of the speed matching, clutch sleeve 242 is moved into its Locked position for releasably coupling the another or sixth drive gear 76 to countershaft 54 to establish the sixth forward gear. In sixth gear, with clutch sleeve 242 coupled to clutch ring 244, blocker ring 240 can be held in place or, alternatively, can retract to release clutch pack 200. Finally, reverse gear is established when the gearshift mechanism is moved to its REVERSE position and fifth clutch actuator 270 is activated to move clutch sleeve 97 into engagement with seventh output gear 84.

In a similar manner to that described for upshifts, the automated shift process for sequential downshifts includes releasing the engaged gear, activating second clutch actuator 264 to move clutch sleeve 142 from its Released position toward its Locked position to cause engagement of clutch pack 100, and engaging the next lower output gear once the speed synchronization process is complete. As noted, engagement of clutch pack 100 during downshifts is used to vary the rotary speed of countershaft 54 relative to output shaft 52. Engine management systems 42 are again controlled during such upshifts to increase the input shaft speed to assist in smooth speed matching. Again, this shift process is conducted with engine clutch 12 maintained in its engaged condition for providing automated powershifts. First synchronization clutch assembly 90 is only used to downshift from sixth gear until the third forward gear is established. Downshifts into second gear and first gear are accommodated by the synchronizer associated with dog clutch 88 and engine management systems 42.

While transmission 14 is shown to include synchronized dog clutches for engaging the second through sixth output gears and the reverse output gear, it is contemplated that non-synchronized dog clutches, or equivalent devices, can be used since the speed matching process can be accurately controlled to eliminate the need for pre-engagement synchronization. The present invention provides an arrangement for incorporating an automated shift system into an otherwise conventional synchromesh multi-speed manual transmission which will permit smooth sequential shifting. Thus, the comfort and convenience of an automatic transmission is realized with the fuel economy advantages typically limited to manual transmissions.

A preferred embodiment of the invention has been disclosed to provide those skilled in the art an understanding of the best mode currently contemplated for the operation and construction of the automated transmission. The invention being thus described, it will be obvious that various modifications can be made without departing from the true spirit and scope of the invention, and all such modifications as would be considered by those skilled in the art are intended to be included within the scope of the following claims.

What is claimed is:

1. A transmission for transferring drive power from an engine to a driveline, comprising:

a first shaft adapted to be driven by the engine;

a second shaft adapted to drive the driveline;

a first constant-mesh gearset having a first drive gear fixed to said first shaft and meshed with a first driven gear rotatably supported on said second shaft;

a second constant mesh gearset having a second drive gear fixed to said first shaft and meshed with a second driven gear rotatably supported on said second shaft;

a third constant-mesh gearset having a third drive gear fixed to said first shaft and meshed with a third driven gear rotatably supported on said second shaft;

another constant-mesh gearset having a another drive gear fixed to said second shaft and meshed with another driven gear rotatably supported on said first shaft;

a first clutch having a first sleeve that is moveable from a released position to a first locked position for releaseably coupling said first driven gear to said second shaft, said first sleeve is further moveable from its released position to a second locked position for releaseably coupling said second driven gear to said second shaft, and a first power-operated actuator for moving said first sleeve;

a second clutch having a second sleeve moveable between a released position and a locked position for releaseably coupling said third driven gear to said second shaft, a first clutch pack operably disposed between said third driven gear and said second shaft, a first thrust mechanism for exerting a clutch engagement force on said first clutch pack in response to movement of said second sleeve from its released position toward its locked position, and a second power-operated actuator for moving said second sleeve between its released and locked positions;

another clutch having another sleeve moveable between a released position and a locked position for releaseably coupling said another driven gear to said first shaft, a second clutch pack operably disposed between said another driven gear and said first shaft, a second thrust mechanism for exerting a clutch engagement force on said second clutch pack in response to movement of said another sleeve from its released position toward its locked position, and a third power-operated actuator for moving said another sleeve; and a transmission controller for controlling actuation of said first, second and another power-operated actuators.

2. The transmission of claim 1 wherein said first clutch pack includes a set of first clutch plates splined to said third driven gear which are interleaved with a set of second clutch plates splined to a hub fixed for rotation with said second shaft, said second sleeve splined to said hub for movement thereon between its released and locked positions, and wherein movement of said second sleeve toward its locked position causes said second sleeve to contact said first thrust mechanism and generate said clutch engagement force for frictionally clamping said first and second clutch plates to provide a speed synchronizing function between said first and second shafts.

3. The transmission of claim 2 wherein said second clutch further comprises:

a clutch ring fixed for rotation with said third driven gear and having clutch teeth engageable with clutch teeth on said second sleeve when said second sleeve is in its locked position;

a blocker ring supported for sliding movement on said hub in response to movement of said second sleeve; and said blocker ring adapted to engage said first thrust mechanism for causing movement thereof relative to said first clutch pack.

4. The transmission of claim 3 wherein said first thrust mechanism is a ball-ramp unit having an actuator ring in contact with said blocker ring, a reaction ring fixed to said third driven gear and adapted to engage said first clutch pack, and rollers retained in aligned cam tracks formed in said actuator ring and said reaction ring, whereby axial movement of said blocker ring caused by movement of said second sleeve toward its locked position causes relative rotation between said actuator ring and said reaction ring such that said rollers move said reaction ring into engagement with said first clutch pack.

5. The transmission of claim 2 wherein said second clutch pack includes a set of clutch plates splined to said another driven gear which are interleaved with a set of clutch plates splined to a hub fixed for rotation with said first shaft, said third sleeve splined to said hub for movement thereon between its released and locked positions, and wherein movement of said another sleeve toward its locked position causes said another sleeve to contact said second thrust mechanism and generate said clutch engagement force for frictionally clamping said and clutch plates to provide a speed synchronizing function between said first and second shafts.

6. The transmission of claim 1 wherein said second shaft is driven at a first speed ratio relative to said first shaft when said first sleeve is located in its first locked position and said second and third sleeves are located in their released positions, a second speed ratio drive connection is established between said first and second shafts when said first sleeve is located in its second locked position and said second and another sleeves are located in their released positions, a third speed ratio drive connection is established between said first and second shafts when said second sleeve located in its locked position and said first and third sleeves are located in their released positions, and a fourth speed ratio drive connection is established between said first and second shafts when said third sleeve is in its locked position and said first and second sleeves are in their release positions.

7. The transmission of claim 6 wherein said controller receives signals from speed sensors capable of detecting the rotary speed of said first and second shafts and is further operable to control sequential upshifts from said first speed ratio to said fourth speed ratio by controlling actuation of said first, second and third actuators.

8. The transmission of claim 7 wherein an upshift from said first speed ratio to said second speed ratio is established when said first sleeve is moved from its first locked position to its released position, said second sleeve is moved from its released position toward its located position for engaging said first clutch pack and synchronizing the speed of said second shaft to that of said second driven gear, said first sleeve then is moved to its second locked position to positively couple said second drive gear to said second shaft, and said another sleeve is returned to its released position.

9. The transmission of claim 8 wherein an upshift from said second speed ratio to said third speed ratio is established when said first sleeve is moved from its second locked position to its released position, said another sleeve is moved from its released position toward its locked position for engaging said second clutch pack and synchronizing the rotary speed of said second shaft to that of said third driven gear, said second sleeve is moved to its locked position to positively couple said third driven gear to said second shaft, and said another sleeve is returned to its released position.

10. The transmission of claim 9 wherein an upshift from said third speed ratio to said fourth speed ratio is established by moving said second sleeve from its locked position to its released position, moving said another sleeve from its released position toward its locked position for engaging said second clutch pack and synchronizing the rotary speed of said another driven gear to that of said first shaft, and then continuing movement of said another sleeve to its locked position for coupling said another driven gear to said first shaft.

11. The transmission of claim 10 wherein a downshift from said fourth speed ratio to said third speed ratio is established by moving said another sleeve from its locked position to its released position, moving said second sleeve from its released position toward its locked position for engaging said first clutch pack and synchronizing the rotary speed of said third driven gear to that of said second shaft, moving said second sleeve from its released position to its locked position to directly couple said third driven gear to said second shaft, and then returning said second sleeve to its released position.

12. The transmission of claim 1 further comprising:

a third shaft driven by the engine;

a fifth constant-mesh gearset having a fifth drive gear fixed to said third shaft which is meshed with a fifth driven gear fixed to said first shaft; and a fourth clutch having a fourth sleeve moveable from a released position to a locked position for releaseably coupling said fifth drive gear to said second shaft, and a fourth power-operated actuator for moving said fourth sleeve under the control of said controller.

13. The transmission of claim 12 further comprising a fourth constant-mesh gearset having a fourth drive gear fixed to said first shaft and which is meshed with a fourth driven gear rotatably supported on said second shaft, and wherein said fourth sleeve is moveable from its release position to a second locked position to couple said fourth driven gear to said second shaft.

14. An automated shift multi-speed transmission driven by an engine for transferring rotary power to a driveline, comprising:

an input shaft driven by the engine;

a countershaft driven by said input shaft;

an output shaft driving the driveline;

first, second, third, and fourth gearsets driven by said countershaft;

a fifth gearset driven by said input shaft;

a sixth gearset driven by said output shaft;

a first clutch having a first sleeve moveable between a released position, a first locked position for releaseably coupling said first gearset to said output shaft, and a second locked position for releaseably coupling said second gearset to said output shaft;

a second clutch having a second sleeve moveable between a released position and a locked position for coupling said third gearset to said output shaft, and a first friction clutch disposed between said third gearset and said output shaft and which is actuated in response to movement of said second sleeve from its released position toward its locked position;

a third clutch having a third sleeve moveable between a released position, a first locked position whereat said fourth gearset is releaseably coupled to said output shaft, and a second locked position whereat said fifth gearset is releaseably coupled to said output shaft;

a fourth clutch having a fourth sleeve moveable between a released position and a locked position for releaseably coupling said sixth gearset to said countershaft, and a second friction clutch disposed between said sixth gearset and said countershaft and which is actuated in response to movement of said fourth sleeve from its released position toward its locked mode;

a first actuator for controlling movement of said first sleeve;

a second actuator for controlling movement of said second sleeve;

a third actuator for controlling movement of said third sleeve;

a fourth actuator for controlling movement of said fourth sleeve;

speed sensors for detecting the rotary speed of said input shaft and said output shaft; and a controller receiving speed signals from said speed sensors and generating control signals for selectively actuating said first, second, third, and fourth actuators to establish six distinct gear ratio drive connections between said input shaft and said output shaft.

15. The automated shift multi-speed transmission of claim 14 wherein said third gearset includes a drive gear fixed for rotation with said countershaft and which is meshed with a driven gear rotatably supported on said output shaft, and wherein said first friction clutch includes a clutch pack of alternately interleaved clutch plates connected between said driven gear and said output shaft, and wherein said clutch pack is disengaged when said second sleeve is located in its released position and is progressively engaged by a thrust mechanism in response to movement of said second sleeve toward its locked position for providing a speed synchronization function between said countershaft and said output shaft.

16. The automated shift multi-speed transmission of claim 15 wherein said second sleeve is coupled to a clutch ring fixed to said driven gear when said second sleeve is in its locked position, and wherein said second clutch further includes a synchronizer that is moveable with said second sleeve into and out of engagement with said thrust mechanism.

17. The automated shift multi-speed transmission of claim 16 wherein said thrust mechanism is a ball-ramp unit having an input member actuated by said synchronizer and an output member adapted to apply a compressive clutch engagement force on said clutch pack.

18. The automated shift multi-speed transmission of claim 14 wherein said sixth gearset includes a drive gear fixed for rotation with said output shaft and which is meshed with a driven gear rotatably supported on said output shaft, and wherein said second friction clutch includes a clutch pack of alternately interleaved clutch plates connected between said driven gear and said countershaft, and wherein said clutch pack is disengaged when said fourth sleeve is located in its released position and is progressively engaged by a thrust mechanism in response to movement of said fourth sleeve toward its locked position for providing a speed synchronization function between said countershaft and said output shaft.

19. The automated shift multi-speed transmission of claim 18 wherein said fourth sleeve is coupled to a clutch ring fixed to said driven gear when said fourth sleeve is in its locked position, and wherein said fourth clutch further includes a synchronizer that is moveable with said fourth sleeve into and out of engagement with said thrust mechanism.

20. The automated shift multi-speed transmission of claim 19 wherein said thrust mechanism is a ball-ramp unit having an input member actuated by said synchronizer and output member adapted to apply a compressive clutch engagement force on said clutch pack.

21. The automated shift multi-speed transmission of claim 14 wherein a first gear ratio is established when said first sleeve is located in its first locked position and said second, third and fourth sleeves are located in their respective released positions, a second gear ratio is established when said first sleeve is located in its second locked position and said second, third and fourth sleeves are located in their respective released positions, a third gear ratio is established when said second sleeve is located in its locked position and said first, third and fourth sleeves are located in their respective released positions, a fourth gear ratio is established when said third sleeve is located in its first locked position and said first, second and fourth sleeves are located in their respective released positions, a fifth gear ratio is established when said third sleeve is located in its second locked position and said first, second and fourth sleeves are located in their respective released positions, and a sixth gear ratio is established when said fourth sleeve is located in its locked position and said first, second and third sleeves are located in their respective positions.

22. The automated shift multi-speed transmission of claim 21 wherein a downshift from sixth gear into fifth gear is established by moving said fourth sleeve from its locked position to its released position, moving said second sleeve from its released position toward its locked position to engage said first friction clutch and synchronize the rotary speed of said output shaft and said input shaft, moving said third sleeve from its released position into its second locked position, and returning said second sleeve to its released position for disengaging said first friction clutch.

23. The automated shift multi-speed transmission of claim 21 wherein a downshift from fifth gear into fourth gear is established by moving said third sleeve from its second locked position into its released position, moving said second sleeve from its released position toward its locked position to engage said first friction clutch, moving said third sleeve to its first locked position, and returning said second sleeve to its released position for disengaging said first friction clutch.

24. The automated shift multi-speed transmission of claim 21 wherein a downshift from fourth gear into third gear is established by moving said third sleeve from its first locked position to its released position, moving said second sleeve from its released position toward its locked position to engage said first friction clutch, and then moving said second sleeve into its locked position.

25. The automated shift multi-speed transmission of claim 21 wherein an upshift from first gear into said second gear is established by moving said first sleeve from its first locked position to its released position, moving said second sleeve from its released position toward its locked position to engage said first friction clutch and synchronize the rotary speed of said second gearset to said output shaft, moving said first sleeve from its released position into its second locked position, and then returning said second sleeve to its released position to disengage said first friction clutch.

26. The automated shift multi-speed transmission of claim 21 wherein an upshift from said second gear into said third gear is established by moving said first sleeve from its second locked position into its released position, moving said fourth sleeve from its released position toward its locked position to engage said second friction clutch for synchronizing the rotary speed of said third gearset with said output shaft, moving said second sleeve from its released position into its locked position, and then returning said fourth sleeve to its released position to disengage said second friction clutch.

27. A transmission for transferring drive power from an engine to a driveline, comprising:

a first shaft adapted to be driven by the engine;

a second shaft adapted to drive the driveline;

at least four constant-mesh gearsets each having a drive gear and a driven gear, at least three drive gears fixed to said first shaft and meshed with driven gears rotatably supported on said second shaft and at least one drive gear fixed to said second shaft and meshed with a driven gear rotatably supported on said first shaft;

at least three clutches each having a respective sleeve that is removeable from a released position to a first locked position, at least one of said three clutches releaseably coupling said one driven gear to said second shaft, said at least one clutch sleeve is further moveable from its released position to a second locked position for releasably coupling a different driven gear to said second shaft;

at least one of said three clutches releaseably coupling yet a different driven gear to said second shaft and including a first clutch pack operably disposed between said yet a different driven gear and said second shaft, a first thrust mechanism for exerting a clutch engagement force on said first clutch pack in response to movement of its respective sleeve from its released position toward its locked position;

at least one of said three clutches releaseably coupling said driven gear to said first shaft and including a second clutch pack operably disposed between said first shaft driven gear and said first shaft, a second thrust mechanism for exerting a clutch engagement force on said second clutch pack in response to movement of its respective sleeve from its released position toward its locked position, and a power-operated actuator for moving each said sleeve; and a transmission controller for controlling actuation of said power-operated actuators.

\* \* \* \* \*